Jan. 31, 1967   C. H. FULLMAN   3,300,968
LASER INITIATED ROCKET TYPE IGNITER
Filed Aug. 4, 1964

INVENTOR.
CARL H. FULLMAN
BY
ATTORNEYS

United States Patent Office 3,300,968
Patented Jan. 31, 1967

---

3,300,968
LASER INITIATED ROCKET TYPE IGNITER
Carl H. Fullman, Santa Clara, Calif., assignor to the United States of America as represented by the Secretary of the Air Force
Filed Aug. 4, 1964, Ser. No. 387,537
2 Claims. (Cl. 60—39.82)

The invention relates to a solid propellant igniter, and more particularly to a device for igniting rockets, either singly or in clusters, by beaming up the rocket nozzle a laser or other electromagnetic beam, focused on a primer.

In successful firing of a cluster of large segmented propellant booster rockets, solid propellant rocket motors have been arranged in segmented quadrangle configuration, producing a high thrust in a very short space of time, measured in seconds.

The success of the project depends upon the techniques developed for the ignition of the rocket clusters. Simultaneous ignition of all cluster barrels is an absolute essential. If one of the motors should fail to ignite, or if all motors making up the cluster should fail to ignite, or if all motors making up the cluster should fail to ignite simultaneously, the launching would also fail. The control steering system would be unable to compensate for course changes caused by late firing or failure in firing of a single barrel.

Hypergolic ignition systems have been used. In this type of system, a highly reactive hypergolic fluid is sprayed along the solid grain of each barrel of the cluster for instant initiation of combustion. In this type of ignition a complicated and very sensitive manifold and valve system is necessary to control the flow of hypergolic fluid to all barrels.

Other systems proposed involve aft-end rocket ignition systems in which small rocket motors are simultaneously fired up the nozzle of each cluster barrel to initiate combustion.

Other prior art igniters employ squibs and assorted electrical circuitry and hardware attached internally of the rocket casing. High pressure seals are necessary for lead-ins and other devices involved.

The object of the present invention is the provision of a new ignition system, applicable both for single or clustered booster rockets, and capable of simultaneous ignition of segmented solid propellant rockets whose capability is of the order of multimillion pound thrust.

A further objects of the invention is the provision of a laser initiated ignition system for rockets, singly or in clusters, wherein sensitive valve systems, wiring, wiring seals and other contact devices heretofore necessary are eliminated.

In the present invention a device is provided which makes possible the utilization of a pulse of high energy, beamed from a laser for igniting solid propellant rockets.

In the device of the present invention, the ignition process may be either direct or indirect. The laser beam may trigger the rocket motor directly, or it may be used to ignite a small igniter rocket motor, the exhaust flame of which comes in contact with the solid propellant of the primary rocket motor and causes it to ignite. In either case, there is no physical contact with the primary rocket or with the starter rocket. The ignition impulse is not received through the casing wall at any point. Instead, the igniter receives its impulse through the nozzle.

In conventional electrical ignition systems, contact must be arranged for in a hazardous and sensitive area. There is extreme danger of accidental firing. In the laser system protection from misfiring can be provided by shades, mirrors, optical blocking or other safety equipment, removed before firing. The laser's high energy pulse is beamed directly, or by reflectors up the nozzle of the booster and focused with a high-resolution optical lens on the igniter motor's indicator, which is the equivalent of a firing pin. Ignition of a cluster of rockets can be performed simultaneously by splitting a laser beam optically, or by a set of lasers beams triggered and powered by a single power source.

A further object of the invention is, therefore, the provision of a lens focusing device adaptable for use with and in combination with booster rocket motors, or starter rocket motors whereby a beam of electromagnetic energy is focused to initiate an igniter train and ignite the solid propellant grain of a rocket motor.

Figure 1:
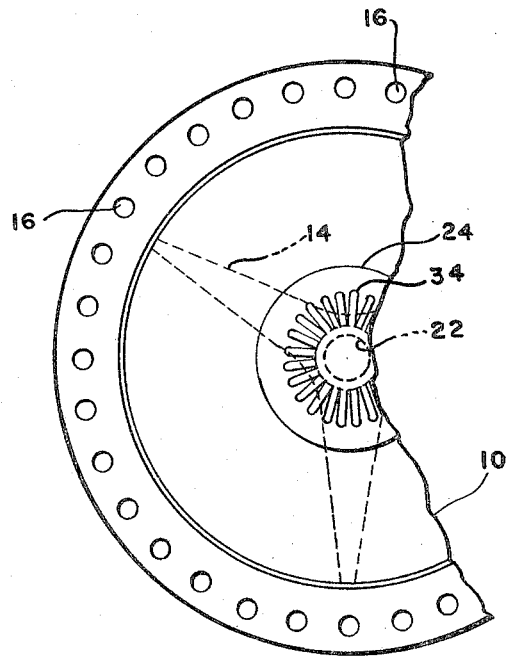
FIG. 1 is an end view of the forward end of the booster device.
Figure 3:
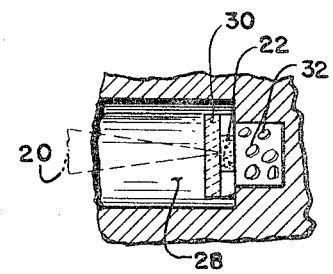
FIG. 3 is a detail of the window and primer.
Figure 2:
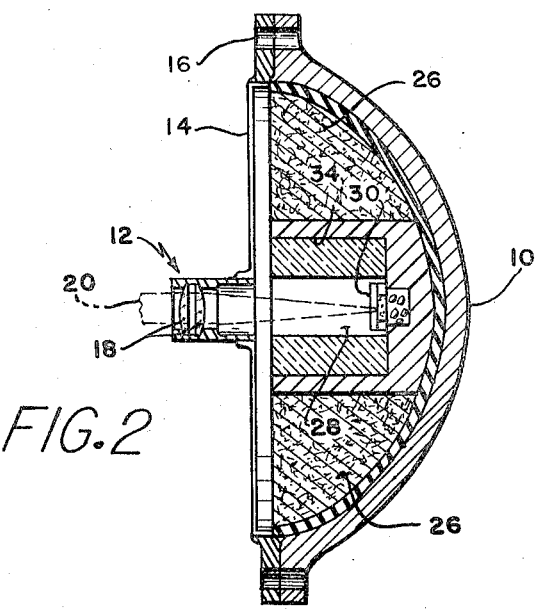
FIG. 2 is a cross section.

Referring more in detail to the drawing, a casing 10 provides also a forward closure. An adjustable lens holder 12 is positioned by a spider element 14 which is secured to the casing 14 by suitable means such as bolts 16. A lens system 18 mounted in the lens holder 12 has the capability of collecting a laser or other beam 20 of electromagnetic energy and focusing it on a heat sensitive primer 22. A body of propellant grain 24, itself surrounded by inert material 26, is provided with a recess 28 for admitting the beam 20 to an initiator train. The initiator train is held in place by a window assembly 30 and is comprised of the primer 22 and a booster charge 32, which may be of granular material and pellets, as shown.

Also embedded in the body of the propellant grain 24 is a fast furning propellant material 34.

In operation, a laser beam, or a beam of some other form of electromagnetic energy is directed through the lens holder 12 which now has the additional function of rocket nozzle. The beam is focused on the primer 22, initiating the granular material and pellets of the booster charge 32. The high temperature gases are produced which will burst the concentrating lenses 18. The lens holder 12 now becomes a rocket nozzle which expels and directs the high temperature gases to ignite the motor grain of a rocket motor.

What is claimed is:

1. A laser initiated rocket type rocket igniter comprising an igniter casing, a recessed body of rocket propellant material in said casing, an initiator train in said recess, said initiator train having a heat sensitive primer, a lens holder, a lens system in said lens holder capable of collecting laser beams originating outside of the device, beaming them down said recess and bringing them to a focus upon said heat sensitive primer to ignite said train, a fast burning propellant material dispersed through said rocket propellant in finger like protuberances for carrying the ignition of said train to said propellant body, the high temperature gases thus formed bursting said lens system, and lens holder becoming a rocket nozzle for the expulsion of said gases.

2. A laser ignition system for rocket motors, said system comprising a casing, a nozzle on said casing, a body of propellant material in said casing, fast burning propellant material contained in said body in dispersed finger like formation, an initiator train comprising a primer, and a booster charge, said train contacting said fast burning material, a lens system in said nozzle capable of collecting and focusing a laser beam, beamed up said nozzle, the primer of said initiator train located at the focal point of said lens system, whereby said primer is ignited by said laser beam, and whereby ignition travels from said primer, through said booster, through said fast burning propellant fingers to said propellant body, igniting said propellant body to burst said lens and expel hot gases thus formed through said nozzle.

References Cited by the Examiner

UNITED STATES PATENTS 3,177,651 4/1965 Lawrence _____ 60—39.82 X
3,217,088 11/1965 Steierman _____ 331—94.5 X MARK NEWMAN, *Primary Examiner.*

CARLTON R. CROYLE, *Examiner.*

D. HART, *Assistant Examiner.*